US008199902B1

(12) United States Patent
Lutton

(10) Patent No.: US 8,199,902 B1
(45) Date of Patent: Jun. 12, 2012

(54) PASSING URL FOR XML DOCUMENTS VIA A TELEPHONE SIGNALING SYSTEM

(75) Inventor: Lawrence M. Lutton, Nashua, NH (US)

(73) Assignee: Avaya Inc., Basking Ridge, NJ (US)

(*) Notice: Subject to any disclaimer, the term of this patent is extended or adjusted under 35 U.S.C. 154(b) by 1324 days.

(21) Appl. No.: 11/439,358

(22) Filed: May 22, 2006

(51) Int. Cl.
*H04M 3/00* (2006.01)

(52) U.S. Cl. ............... 379/265.09; 370/352; 379/88.04; 379/88.17; 379/201.01; 379/266.1; 709/201; 709/219; 709/229

(58) Field of Classification Search .......... 370/351–356, 370/259–271; 379/101.01–102.03, 106.01, 379/142.01–142.18, 201.01–201.05, 201.12, 379/67.1–88.28, 265.01–266.1; 709/201–207, 709/217–244; 715/200–209, 716–718, 733–749; 348/14.01–14.16; 455/412.1–417; 704/270.1–278
See application file for complete search history.

(56) References Cited

U.S. PATENT DOCUMENTS

| | | | | |
|---|---|---|---|---|
| 5,043,983 A * | 8/1991 | Dorst et al. | ............. | 370/384 |
| 5,384,841 A * | 1/1995 | Adams et al. | ............. | 379/266.04 |
| 5,809,127 A * | 9/1998 | Ostreil | ............. | 379/201.05 |
| 6,041,103 A * | 3/2000 | La Porta et al. | ............. | 379/67.1 |
| 6,192,057 B1 * | 2/2001 | Dueck et al. | ............. | 370/524 |
| 6,215,864 B1 * | 4/2001 | Goyal et al. | ............. | 379/221.11 |
| 6,256,381 B1 * | 7/2001 | Donaghue, Jr. | ............. | 379/265.01 |
| 6,351,639 B1 * | 2/2002 | Motohashi | ............. | 455/420 |
| 6,687,341 B1 * | 2/2004 | Koch et al. | ............. | 379/88.17 |
| 6,825,955 B1 * | 11/2004 | Shibata | ............. | 358/402 |
| 6,987,850 B1 * | 1/2006 | Watson | ............. | 379/265.02 |
| 7,107,607 B2 * | 9/2006 | Miyagi et al. | ............. | 725/105 |
| 7,286,821 B2 * | 10/2007 | Kraft et al. | ............. | 455/415 |
| 7,688,805 B2 * | 3/2010 | Ramakrishna et al. | ....... | 370/352 |
| 2002/0021696 A1 * | 2/2002 | Minborg | ............. | 370/392 |
| 2002/0174206 A1 * | 11/2002 | Moyer et al. | ............. | 709/221 |
| 2003/0088421 A1 * | 5/2003 | Maes et al. | ............. | 704/270.1 |
| 2004/0023676 A1 * | 2/2004 | Lee | ............. | 455/466 |
| 2004/0208134 A1 * | 10/2004 | Neyman et al. | ............. | 370/259 |
| 2005/0073999 A1 * | 4/2005 | Koch | ............. | 370/352 |
| 2005/0100150 A1 * | 5/2005 | Dhara et al. | ............. | 379/142.01 |
| 2006/0153347 A1 * | 7/2006 | Clark et al. | ............. | 379/88.18 |
| 2007/0078925 A1 * | 4/2007 | Neil et al. | ............. | 709/201 |

* cited by examiner

*Primary Examiner* — Hemant Patel
(74) *Attorney, Agent, or Firm* — Chapin IP Law, LLC; David W. Rouille

(57) ABSTRACT

A method, apparatus and computer program product for passing a URL for XML documents via a telephone signaling system is presented. A communication is received at a first system, and a document including information relating to the communication is produced. The document is sent to a service, and the communication is transferred to a second system. The communication includes an address for retrieving the document from the service.

17 Claims, 4 Drawing Sheets

PASSING URL FOR XML DOCUMENTS VIA A TELEPHONE SIGNALING SYSTEM

BACKGROUND

Distributed systems and applications have become ubiquitous. One method of communication between components of a distributed system or distributed application is to use Integrated Services Digital Network/System Signaling 7 (ISDN/SS7) signaling. An example of this may be a Contact Center, wherein ISDN/SS7 is used to communicate between an Interactive Voice Response (IVR) system and a Private Branch Exchange (PBX). On the public switched telephone network (PSTN), Signaling System 7 (SS7) is a system that puts the information required to set up and manage telephone calls in a separate network rather than within the same network that the telephone call is made on. Signaling information is in the form of digital packets. SS7 and ISDN use out-of-band signaling, meaning that signaling (control) information travels on a separate channel rather than within the same channel as the telephone call.

An SS7 communication includes a User-to-User Information (UUI) field. The UUI contains one field of up to 96 characters. Conventional systems use this UUI field to send data between servers/applications systems. This field may be used to pass fixed format data between components of a distributed system or application. For example, a credit card application might transfer a 16-digit account number, or a human resource application might transfer a caller's name. In such a scenario, the sending application must be aware of the receiving application's data requirements, and send the appropriate data. For an outsourcer this means that the sending application needs to be customized for each customer's needs.

SUMMARY

Conventional mechanisms such as those explained above suffer from a variety of deficiencies. One such deficiency is that conventional systems utilize the UUI field of SS7 signaling to send fixed format data. Because the sending and receiving applications must agree completely upon the usage of the UUI field, the sending and receiving parties must synchronize implementation and maintenance of their applications. This may be difficult across different institutions. The data passed in the UUI field is proprietary, and the format of the data must be agreed in advance between the sender and receiver. Critical information (such as an account number) may be sent in the clear through an insecure channel. A network sniffer could easily tie information (such as the account number and originating telephone number) together, with no audit trail to indicate that the channel has been compromised.

Embodiments of the invention significantly overcome such deficiencies and provide mechanisms and techniques that provide passing a Universal Resource Locator (URL) for eXtensible Mark-up Language (XML) Documents via a telephone signaling system. By way of the present invention, a pointer to external data is passed to an application in the UUI instead of passing the data directly. A method of passing a URL for XML documents via a telephone signaling system includes receiving a communication at a first system, and producing a document including information relating to the communication. The method further includes sending the document to a service, and transferring the communication to a second system, the communication including an address for retrieving the document from the service.

In a particular embodiment of a method for passing a URL for XML documents via a telephone signaling system, the method includes receiving a communication at an Interactive Voice Response system (IVR). The method further includes producing an XML document including information relating to the communication, and sending the XML document to a service. The method further includes transferring the communication to a Private Branch Exchange (PBX) computer telephony (CT) system, the communication including an address for retrieving the XML document from the service.

The XML document which is transferred can contain a rich data structure. The sending application creates the XML document, which is a self-defining data structure. The receiving application parses the XML document for the information it requires. Multiple applications at the receiving site can each extract the information that they need from the XML document. Because the actual data content being transferred is flexible, changes to the systems at each end may be implemented by the parties exchanging data independently. The XML document transferred through this invention is standards-based, thus the XML document can be parsed or viewed with off-the-shelf technology. The URL sent in the clear is not inherently meaningful, and provides no direct value if compromised. Any sensitive information (such as an account number) is transmitted through a secure media such as Secure Sockets Layer (SSL) and access to the contents of the document can be thereby restricted. SSL is a commonly used protocol for managing the security of a message transmission on the Internet. SSL uses a program layer located between the Internet's Hypertext Transfer Protocol (HTTP) and Transport Control Protocol (TCP) layers. Advantages associated with the present invention include flexibility of the data that can be shared and the ability to efficiently and securely coordinate the sharing of information between businesses.

In a particular embodiment, before transferring a call to a Private Branch Exchange (PBX), an IVR writes and sends all relevant data as an XML document to a Simple Object Access Protocol (SOAP) service. The IVR also places the URL (up to 96 characters in length) for the document into the UUI field of an SS7 message. A Computer Telephony (CT) application passes the UUI (containing the URL) to an Event Handler (e.g., a Customer Relation Management application or CRM), which then retrieves the XML document via SOAP and parses the retrieved document.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides for passing a URL for XML documents via ISDN/SS7 UUI as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other embodiments include a computer readable medium having computer readable code thereon for passing a URL for XML documents via a telephone signaling system. The computer readable medium includes instructions for receiving a communication at a first system, and instructions for producing a document including information relating to the communication. The computer readable medium further includes instructions for sending the document to a service, and instructions for transferring the communication to a second system, the communication including an address for retrieving the document from the service.

In another particular embodiment, the computer readable medium has computer readable code thereon for passing a URL for XML documents via ISDN/SS7 UUI. The medium includes instructions for receiving a communication at an Interactive Voice Response system (IVR). The medium further includes instructions for producing a document including information relating to the communication, and instructions for sending the document to a service. The medium further includes instructions for transferring the communication to a Private Branch Exchange (PBX) computer telephony (CT) system, the communication including an address for retrieving the document from the service.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing for passing a URL for XML documents via a telephone signaling system as explained herein. The computer program logic, when executed on at least one processor within a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as to explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
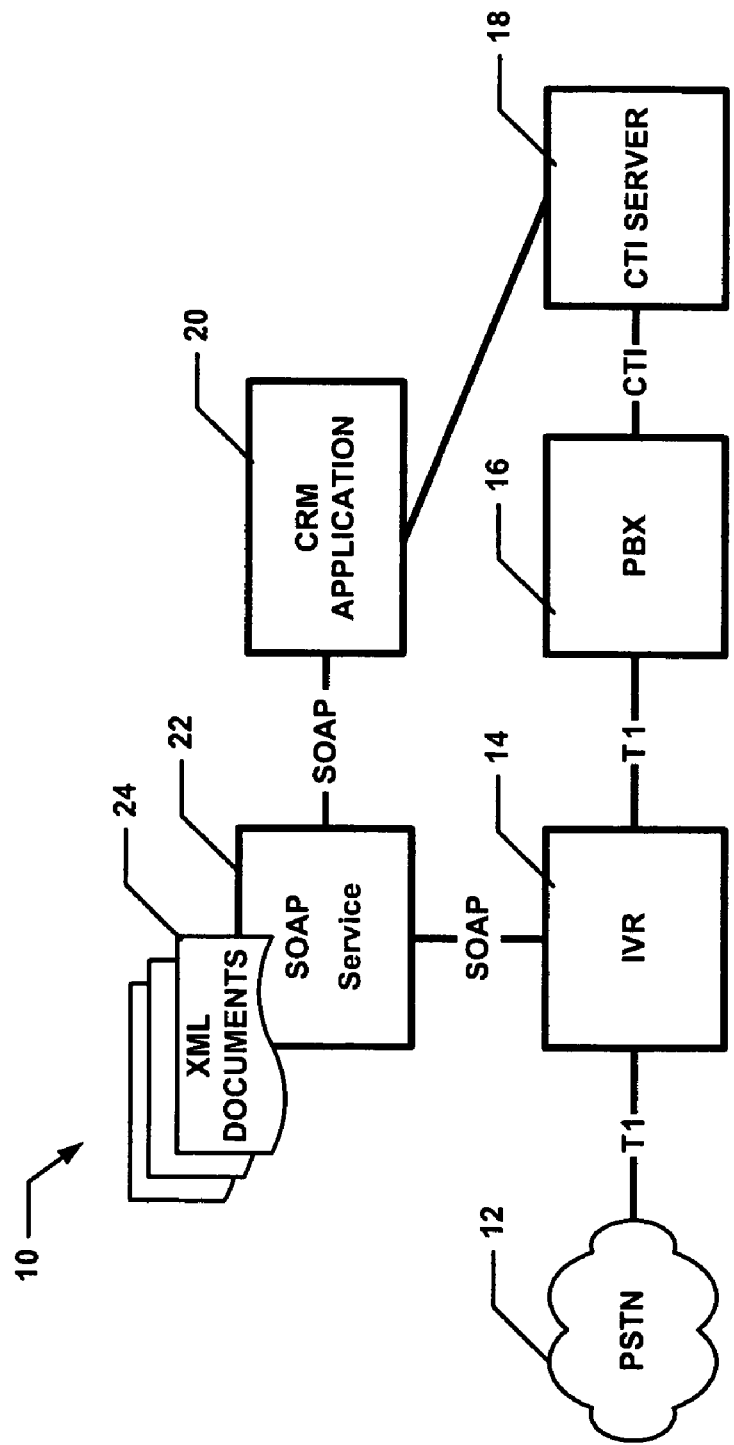
FIG. 1 comprises a block diagram of a call center which provides for passing a URL for XML documents via a telephone signaling system in accordance with embodiments of the invention.

FIG. 1 shows an example environment 10, in this example a contact center, wherein passing a URL for XML documents via a telephone signaling system has been incorporated. The particular environment 10 includes a public switched telephone network (PSTN) 12. The PSTN is the aggregate of the world's public circuit-switched telephone networks. Originally a network of fixed-line analog telephone systems, the PSTN is now almost entirely digital, and now includes mobile as well as fixed telephones. The PSTN 12 is a worldwide telephone system that provides telephone call connections, including telephone connections to a contact center. PSTN 12 is in communication with a first system, such as an interactive voice response system (IVR) 14.

The IVR 14 is a system that provides voice queries to a telephone caller. Voice queries typically direct the telephone caller through a series of selections that can be chosen by the telephone caller via button pushes on the telephone keypad. Interactive Voice Response (IVR) is an automated telephony system that interacts with callers, gathers information and routes calls to the appropriate recipient. An IVR system (IVRS) accepts a combination of voice telephone input and touch-tone keypad selection and provides appropriate responses in the form of voice, fax, callback, e-mail and perhaps other media. An IVR system consists of telephony equipment, software applications, a database and a supporting infrastructure. An IVR application provides pre-recorded voice responses for appropriate situations, keypad signal logic, access to relevant data and, potentially, the ability to record voice input for later handling. Using computer telephony integration (CTI), IVR applications can hand off a call to a human being who can view data related to the caller at a display. The IVR 14 is in communication with a second system, for example a Private Branch Exchange (PBX) 16.

The PBX 16 comprises a sub-system that can route incoming telephone calls to intended call recipients, or agents. A PBX (private branch exchange) is a telephone system within an enterprise that switches calls between enterprise users on local lines while allowing all users to share a certain number of external phone lines. The main purpose of a PBX is to save the cost of requiring a line for each user to the telephone company's central office. The PBX 16 is in communication with a Computer Telephony Integration (CTI) server 18.

The CTI server 18 is used to manage telephone calls. In particular a CTI server is used to provide computerized services for call centers, such as those that direct a phone call to the right department at a business. The CTI server 18 receives the identifying information and coordinates the identifying information with "caller data," for example account history associated with the telephone caller. The CTI server 18 is in communication with an application program, such as Customer Relationship Management (CRM) Application 20 that can provide a display of the caller data in a "screen pop" to an agent.

An example of a CRM application 20 is the Siebel contact center software, available from Siebel Systems of San Mateo, Calif. The Siebel CRM software provides an interface including a toolbar allowing an agent to perform various actions such as log-in, answer a call, receive a screen pop, and log-out.

Also shown is a Simple Object Access Protocol (SOAP) service 22. SOAP provides a platform independent way to access and utilize services located on different distributed systems. SOAP utilizes XML, and SOAP service 22 is used to manage XML documents 24.

By way of the present invention, the IVR 14 receives a call through PSTN 12. Before transferring the call to the PBX 16, the IVR 14 writes and sends all relevant data as an XML document 24 to the SOAP service 22. IVR 14 then places the URL referencing the document on the SOAP service into the UUI field of an SS7 message and sends the message to PBX 16. PBX 16 forwards the message to the CTI Server 18. The CTI Server 18 passes the UUI (containing the URL) to an the CRM application 20, which then retrieves the XML document 24 via SOAP service 22 and parses the retrieved document 24.

By utilization of a URL in the UUI field instead of sending fixed format data in UUI Field, several advantages are realized. The XML document 24 that is transferred can contain a rich data structure. The IVR 14 creates the XML document 24, which is a self-defining data structure. The CRM application 20 parses the XML document 24 for the information it requires. Multiple applications at the receiving site can each extract the information that they need from the XML document 24. Because the actual data content being transferred is flexible, changes may be implemented independently. The XML document 24 transferred through this invention is standards-based. It can be parsed or viewed with off-the-shelf technology. The URL sent in the clear is not inherently meaningful, and provides no direct value if compromised. The sensitive information (such as account number) is transmitted only through a secure media (e.g., SSL). Other advantages associated with the present invention include flexibility of the data that can be shared and the ability to efficiently and securely coordinate the sharing of information between businesses.

Figure 2:
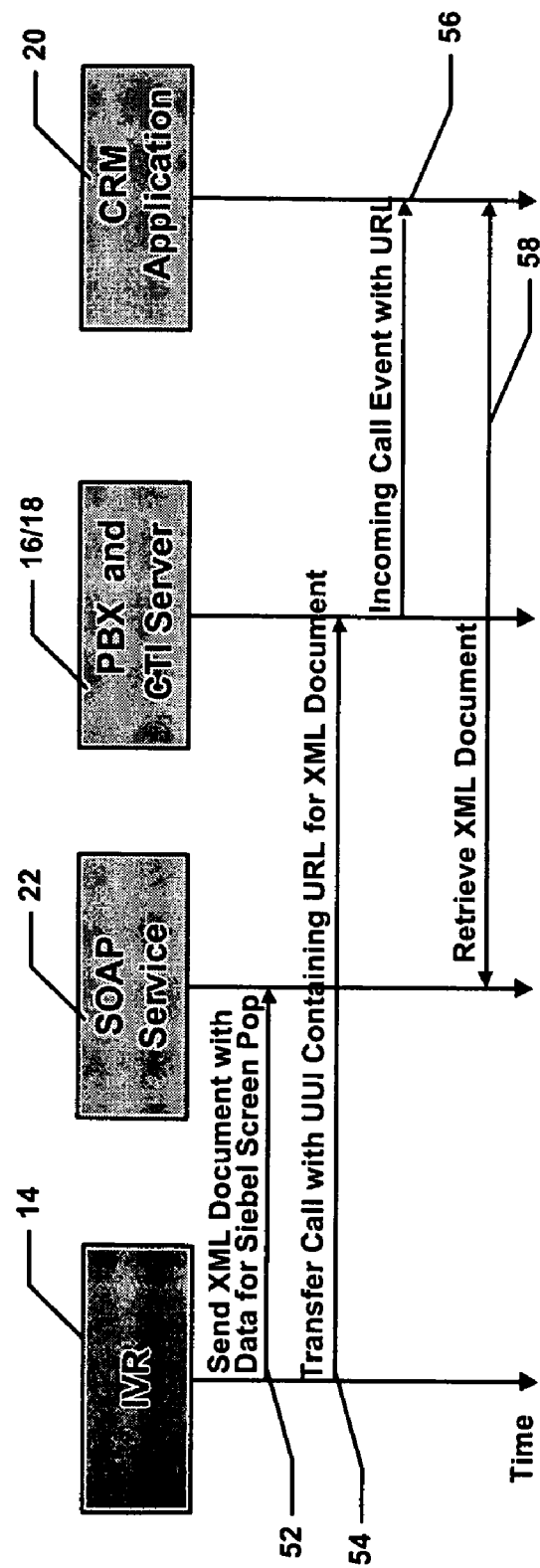
FIG. 2 shows an event trace diagram for passing a URL for XML documents via a telephone signaling system in accordance with embodiments of the invention.

Referring now to FIG. 2, a particular embodiment of an event trace diagram 50 utilizing the present invention is shown. The event trace diagram shows the events and communications that are sent and received as part of the process of passing a URL for XML documents via a telephone signaling system. A first event 52 is a communication sent from the IVR 14 to the SOAP service 22. This communication includes the XML based document and data for a Screen Pop. The next event 54 is sent from the IVR 14 to the PBX 16 and CTI Server 18. This communication transfers the call with an SS7 message wherein the UUI contains the URL for the XML document. Event 56 occurs next. The incoming call event, including the URL for the XML document is provided by the PBX/CTI server 16/18 to the CRM application 20. Event 58 takes place next, wherein the CRM application 20 utilizes the URL to retrieve the XML document and data for the screen pop.

Figure 3:
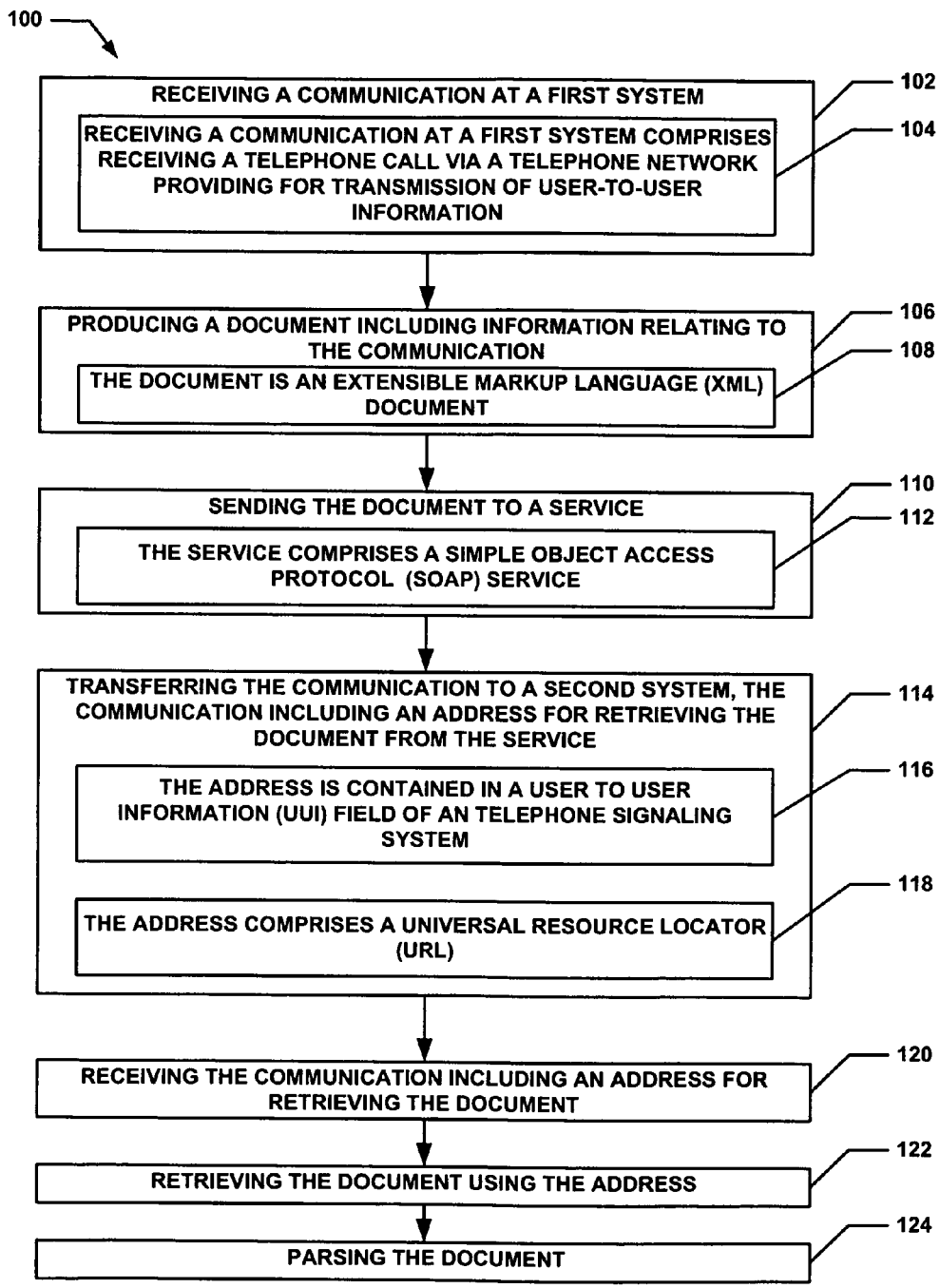
FIG. 3 comprises a flow diagram of a particular embodiment of a method for passing a URL for XML documents via a telephone signaling system in accordance with embodiments of the invention.

A flow chart of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 100 for passing a URL for XML documents via a telephone signaling system is shown. The method 100 begins with processing block 102 which discloses receiving a communication at a first system. In certain embodiments the first system may be realized as an Interactive Voice Response system (IVR). In a typical application, such as a call center environment, the communication would be a telephone call received by way of a telephone network providing for transmission of User-to-User information, as recited in processing block 104.

Processing block 106 states producing a document including information relating to the communication. As recited in processing block 108, the document is an XML document. The XML document which is transferred is a self-defining data structure. The XML document is standards-based, thus it can be parsed or viewed with off-the-shelf technology.

Processing block 110 recites sending the document to a service. In a particular embodiment the service is a SOAP service. SOAP provides a platform independent way to access and utilize services located on different distributed systems. SOAP utilizes XML, and the SOAP service is used to manage XML documents.

Processing block 114 discloses transferring the communication to a second system, the communication including an address for retrieving the document from the service. The second system may be realized as a Private Branch Exchange (PBX) computer telephony integration (CTI) system, As further recited in processing block 116, the address is contained in a User to User Information (UUI) field of a telephone signaling system, for example an Integrated Services Digital Network/Signal System 7 (ISDN/SS7) communication. Further still, as recited in processing block 118 the address comprise a Universal Resource Locator (URL). The URL sent in the clear is not inherently meaningful, and provides no direct value if compromised. The URL can be used to retrieve the XML document from the SOAP service.

Processing continues with processing block 120 which states receiving at the PBX the communication including an address for retrieving the document. Processing block 122 recites retrieving the document using the address. The URL is used to acquire the document from the SOAP service.

Processing block 124 discloses parsing the document. This could include, as an example, producing a screen pop from the information in the retrieved XML document, and forwarding the screen pop data to the CRM application. Any sensitive information (such as account number) is transmitted only through a secure media (e.g., SSL). By way of the above-described invention, the ability to efficiently and securely coordinate the sharing of information between businesses is provided.

Figure 4:
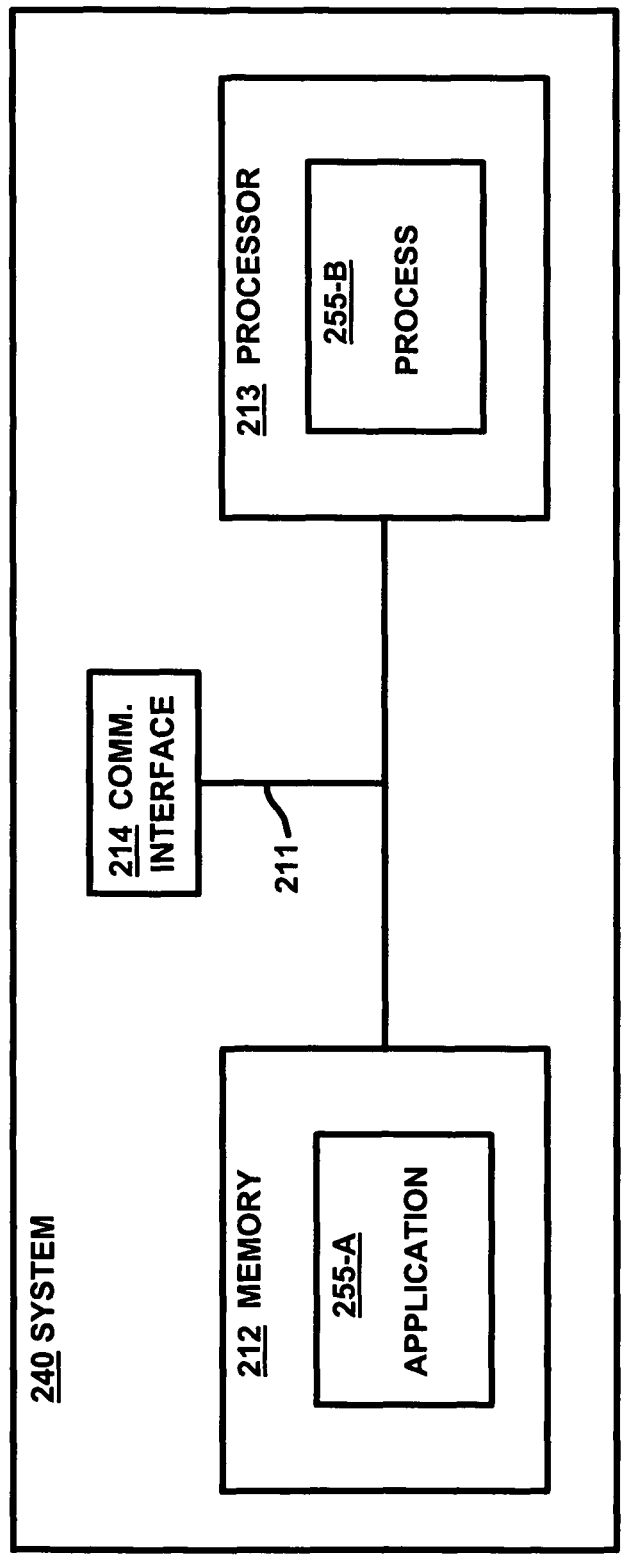
FIG. 4 illustrates an example computer system architecture for a computer system that performs passing a URL for XML documents via a telephone signaling system in accordance with embodiments of the invention.

FIG. 4 illustrates example architectures of a computer system that is configured as an Interactive Voice Response (IVR) system 240. The system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
    receiving a communication from a caller at an Interactive Voice Response (IVR) system;
    producing a document including information relating to said communication by said IVR;
    sending said document to a service;
    transferring said communication to a Computer Telephony Integration (CTI) server, said communication including an address for retrieving said document from said service, wherein said address is contained in a User-to-User Information (UUI) field of a telephone signaling system, wherein said transferring said communication to CTI server takes place on a separate network rather than within the same network that the receiving a communication at an IVR is made on;
    receiving said communication including an address for retrieving said document at said CTI server and passing said UUI to a Customer Relationship Management (CRM) application;
    retrieving said document using said address; and
    parsing said document by said CRM application to produce a screen pop providing a display of caller data.

2. The method of claim 1 wherein said document is an eXtensible Markup Language (XML) document.

3. The method of claim 1 wherein said address comprise a Universal Resource Locator (URL).

4. The method of claim 1 wherein said service comprises a Simple Object Access Protocol (SOAP) service.

5. The method of claim 1 wherein said receiving a communication at an IVR comprises receiving a telephone call via a Telephone Network providing for the transmission of User to User Information.

6. A non-transitory computer readable medium having computer readable code thereon for passing data, the medium comprising:
    instructions for receiving a communication from a caller at an Interactive Voice Response (IVR) system;
    instructions for producing a document including information relating to said communication by said IVR;
    instructions for sending said document to a service;
    instructions for transferring said communication to a Computer Telphony Integration (CTI) server, said communication including an address for retrieving said document from said service, wherein said address is contained in a User-to-User Information (UUI) field of a telephone signaling system, wherein said transferring said communication to a CTI server takes place on a separate network rather than within the same network that the receiving a communication at an IVR is made on;
    instructions for receiving said communication including an address for retrieving said document at said CTI server and passing said UUI to a Customer Relationship Management (CRM) application;
    instructions for retrieving said document using said address; and
    instructions for parsing said document by said CRM application to produce a screen pop providing a display of caller data.

7. The computer readable medium of claim 6 wherein said document is an eXtensible Markup Language (XML) document.

8. The computer readable medium of claim 6 wherein said address comprise a Universal Resource Locator (URL).

9. The computer readable medium of claim 6 wherein said service comprises a Simple Object Access Protocol (SOAP) service.

10. The computer readable medium of claim 6 wherein said receiving a communication at an IVR comprises receiving a telephone call via a Telephone Network providing for the transmission of User to User information.

11. A system comprising:
    a memory;
    a processor;
    a communications interface;
    an interconnection mechanism coupling the memory, the processor and the communications interface; and
    wherein the memory is encoded with an application for passing data that when performed on the processor, provides a process for processing information, the process causing the computer system to be capable of performing the operations of:

receiving a communication from a caller at an Interactive Voice Response System;

producing a document including information relating to said communication by said IVR;

sending said document to a service;

receiving said communication to a Computer Telephony Integration (CTI) server, said communication including an address for retrieving said document at said CTI server;

transferring said communication to a Computer Telephony Integration (CTI) server, said communication including an address for retrieving said document from said service, wherein said address is contained in a User-to-User Information (UUI) field of a telephone signaling system, wherein said transferring said communication to a CTI server takes place on a separate network rather than within the same network that the receiving a communication at an IVR is made on;

receiving said communication including an address for retrieving said document at said CTI server and passing said UUI to a Customer Relationship Management (CRM) application;

retrieving said document using said address; and parsing said document by said CRM application to produce a screen pop providing a display of caller data.

12. The system of claim 11 wherein said document is an eXtensible Markup Language (XML) document, wherein said address comprise a Universal Resource Locator (URL), wherein said address is contained in a User to User Information (UUI) field of a telephone signaling system, and wherein said service comprises a Simple Object Access Protocol (SOAP) service.

13. The method of claim 1 wherein said caller data includes account history associated with said caller.

14. The computer readable medium of claim 6 wherein said caller data includes account history associated with said caller.

15. The system of claim 11 wherein said caller data includes account history associated with said caller.

16. The method of claim 1 wherein said UUI field comprises a UUI field of a System Signaling 7 (SS7) message.

17. The computer readable medium of claim 6 wherein said UUI field comprises a UUI field of a System Signaling 7 (SS7) message.

* * * * *